(12) United States Patent
Kushner et al.

(10) Patent No.: US 9,605,988 B2
(45) Date of Patent: Mar. 28, 2017

(54) NESTED MEASURING CUPS

(71) Applicant: Urban Trend LLC, Newport Beach, CA (US)

(72) Inventors: Robert G. Kushner, Hong Kong (CN); Christopher Anzalone, Eagle (ID)

(73) Assignee: Urban Trend, LLC, Newport Beach, CA (US)

( * ) Notice: Subject to any disclaimer, the term of this patent is extended or adjusted under 35 U.S.C. 154(b) by 134 days.

(21) Appl. No.: 14/562,273

(22) Filed: Dec. 5, 2014

(65) Prior Publication Data
US 2015/0160064 A1    Jun. 11, 2015

Related U.S. Application Data

(63) Continuation-in-part of application No. 14/098,737, filed on Dec. 6, 2013, now Pat. No. 9,354,098.

(51) Int. Cl.
*G01F 19/00* (2006.01)

(52) U.S. Cl.
CPC .................................. *G01F 19/00* (2013.01)

(58) Field of Classification Search
CPC ........................................................ G01F 19/00
See application file for complete search history.

(56) References Cited

U.S. PATENT DOCUMENTS

| | | | |
|---|---|---|---|
| 6,263,732 B1 | 7/2001 | Hoeting | |
| 7,306,120 B2 | 12/2007 | Hughes | |
| 2013/0319900 A1* | 12/2013 | Fowler | B65D 21/0231 206/509 |

OTHER PUBLICATIONS

Pyrex 2 Cup Measuring Cup, Web Page, Shopworldkitchen.com, Item # 6001075, 2 pages.
OXO Angled Measuring Cup—2 Cup, Web Page, Oxo.com, Item # 70981V3, 1 Page.

* cited by examiner

*Primary Examiner* — Paul West
(74) *Attorney, Agent, or Firm* — Greenberg Traurig, LLP

(57) ABSTRACT

A measuring cup may have volumetric indicia printed along upper and lower surfaces of a reference member or centerpiece disposed near a central portion of a space encircled by a sidewall of the measuring cup. The volumetric indicia may be viewable from above the measuring cup while the cup is disposed on a horizontal countertop or work surface. When inverted, the volumetric indicia printed along a lower surface of the reference member may likewise be viewable from above. In essence, the measuring cup contains first and second receptacles for measuring volumes of substances. The first receptacle is accessible from a "top" of the measuring cup, while the second receptacle is accessible from a "bottom" of the measuring cup. The measuring cup may also include additional measuring receptacles that are removably retained in the second receptacle accessible through the bottom of the measuring cup.

20 Claims, 17 Drawing Sheets

NESTED MEASURING CUPS

CROSS REFERENCE TO RELATED APPLICATION

This application is a non-provisional application claiming priority from U.S. patent application Ser. No. 14/098,737, filed Dec. 6, 2013, entitled "Measuring Cup" and incorporated herein by reference in its entirety.

FIELD OF THE DISCLOSURE

The present disclosure relates generally to measuring cups and, more particularly, to nested measuring cups having volumetric indicia that are readable from various angles, including from directly above the measuring cup.

BACKGROUND OF RELATED ART

Measuring cups are known in the art. One utility amongst many derived from a measuring cup is related to the ease with which volumetric indicia on the measuring cup may be read by a user. A variety of suitable units of measurement are currently used to indicate the volume of the substance within a measuring cup. Traditional measuring cups have indicia marked upon the measuring cup sidewall in such a manner that makes the indicia difficult to read, depending at least in part upon the degree of preciseness needed, the materials from which the measuring cup is manufactured, and the physical ability of the user, for example. In the case of a measuring cup that is made from transparent or translucent material, the most precise way to measure the substance contained therein is to place the measuring cup upon a level surface, pour a substance to be measured into the measuring cup, and then stoop down to the level of the measuring cup to attempt to visually detect the bottom of a liquid meniscus or to a level surface of solid substance. An alternative method to read the volumetric indicium corresponding to the volume of a substance in a transparent or translucent measuring cup is to lift the measuring cup to eye level and attempt to hold the measuring cup steady while visually detecting the appropriate volumetric indicium. In either case, the user of the measuring cup is looking in a generally horizontal direction to detect the volume.

Furthermore, prior art measuring cups that are opaque can be even more difficult to read than transparent or translucent measuring cups. To read the volume of a substance held within an opaque measuring cup, a user typically peers over an upper margin of the measuring cup to eyeball, as best possible, a level to which the substance risen, either by stooping to the measuring cup's level or by lifting the measuring cup to eye level.

While the methods described above for determining the volume of a substance in a measuring cup may seem simple enough for some users, these methods can prove to be difficult for others. Users with physical ailments, for example, may not only have substantial difficulty in stooping over to accurately read the volume of a substance in a measuring cup placed on a level surface, but may also be challenged to lift a measuring cup to eye level and hold the cup steady to read the volume of the substance held therein. Particularly when precise measurement of the volume of a substance within a measuring cup is critical to a task, the simple actions of bending over or lifting a measuring cup to eye level, which comes easy to some users, may become difficult and uncomfortable for others. And even for able-bodied users, having to adjust one's eye level to that of the measuring cup is, at the very least, inconvenient.

Measuring the volume of cooking ingredients using prior art measuring cups can also be frustrating. As mentioned above, it can be difficult for a user to stoop over to read the level of a substance when placed on a level surface or when lifted to eye level. An unsteady hand not only makes the volume of the substance difficult to determine when a measuring cup is lifted to eye level, but a user may spill the substance or even drop the measuring cup when attempting to do so.

Measuring cups are not limited in their utility to the kitchen, of course. They may also be used for measuring proper ratios of non-edible substances, such as gasoline, oil, and antifreeze, for example, the precise measurement of which may be critical. Other common household solutions such as toxic or caustic substances, for example, can be dangerous. When a measuring cup is filled with these solutions, the possibility of spilling them on the user or within the proximity of a child or a pet greatly increases when a measuring cup must be raised to eye level to determine the volume of the substance.

DETAILED DESCRIPTION

Figure 1:
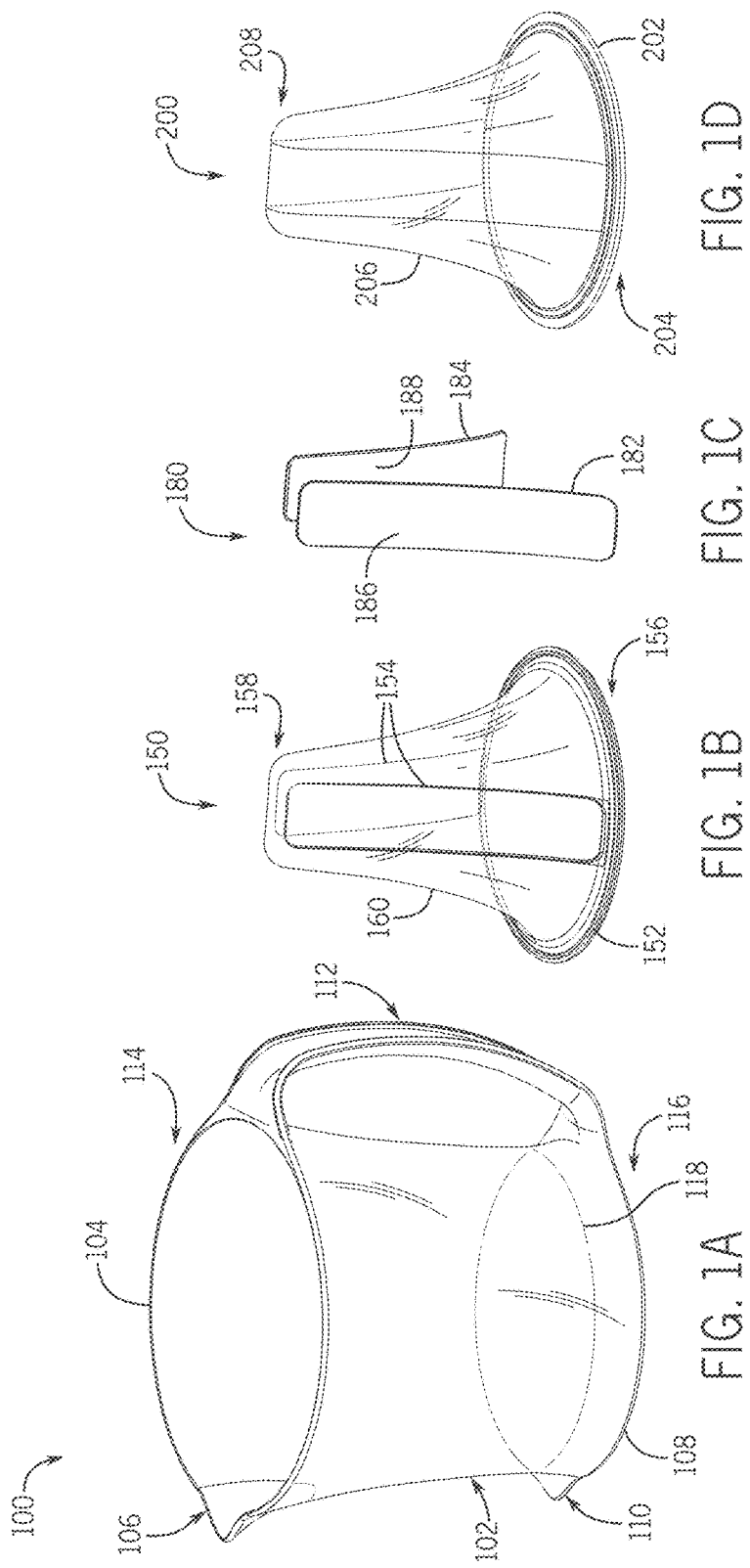
FIG. 1A is a front perspective view of an example subassembly of an example measuring cup.
FIG. 1B is a front perspective view of an example first portion of an example columnar ramp that can be utilized as a reference member and disposed within the example subassembly shown in FIG. 1A.
FIG. 1C is a front perspective view of an example printed insert that can be disposed adjacent to the example first portion of FIG. 1B.
FIG. 1D is a front perspective view of an example second portion of the example columnar ramp that can be disposed within the example subassembly shown in FIG. 1A.

Before any embodiments of the disclosure are explained in detail, it is to be understood that the disclosure is not limited in its application to the details of construction and the arrangement of components set forth in the following description or illustrated in the following figures. The example measuring cups are capable of other constructions and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. The term "affixed" is used broadly and encompasses both direct and indirect mounting, connecting, and coupling, whether direct or indirect. The following disclosure of example measuring cups and their components is not intended to limit the scope of the disclosure to the precise form or forms detailed herein. Instead the following disclosure is intended to be illustrative so that others may follow its teachings.

In general, an example measuring cup that solves the problems discussed above and improves the state of current measuring cups may have a sidewall that encircles a space, with the sidewall being at least partially defined by and/or having an upper periphery and a lower periphery. An upper spout may be disposed along the upper periphery, and in some examples, a lower spout may be disposed along the lower periphery. Moreover, a reference member may be disposed substantially at a central portion of the space encircled by the sidewall. The reference member may in some examples have an outer periphery that is affixed to the sidewall, though the reference member is not located along or integrated into the sidewall.

The reference member may in some examples form two receptacles in the space formed by the sidewall. A first receptacle for receiving substances to be volumetrically measured may be accessed through the upper periphery, while a second receptacle for receiving substances to be volumetrically measured may be accessed through the lower periphery. Thus, at least in some examples, both the upper and lower peripheries of the sidewall provide access to receptacles for measuring the volume of substances. In other words, in some examples there are two measuring receptacles in one invertible measuring cup. In some examples, though, the measuring cup may include a traditional base such that a second receptacle is not included. In these examples, the reference member may be affixed at least one of the sidewall or the base.

Nonetheless, the reference member may include a first set of volumetric indicia that are at least partially upward-facing and can be viewed from above the measuring cup. In some examples, the reference member may further include a second set of volumetric indicia that are at least partially downward-facing and can be viewed from below the measuring cup. In some examples, the reference member may be formed of a columnar ramp that includes a first portion, a second portion that is generally seated on the first portion, and at least one printed insert that is sandwiched between the first and second portions and includes the volumetric indicia. As those having ordinary skill in the art will recognize, the example measuring cups may include a wide variety of other features as disclosed more fully below.

Referring now to FIG. 1A, an example subassembly 100 of an invertible measuring cup is shown. The example subassembly 100 may generally include a sidewall 102, an upper periphery 104, an upper spout 106, a lower periphery 108, a lower spout 110, and a handle 112. The sidewall 102 may include and/or extend between the upper periphery 104 and the lower periphery 108. In some examples, the upper spout 106 may be disposed along the upper periphery 104 of the sidewall 102, at a top end 114 of the subassembly 100, and the lower spout 110 may be disposed along the lower periphery 108 of the sidewall 102, at a bottom end 116 of the subassembly 100. In one example, as shown in FIG. 1A, the example handle 112 is affixed to the sidewall 102 at the upper periphery 104 and at the lower periphery 108. The example handle 112 is advantageous because the handle 112 can be easily grasped regardless of which end 114, 116 is being utilized. In other examples, though, the handle 112 may have a cantilever design such that only one portion of the handle 112 is affixed to the sidewall 102. In either case, the handle 112 may be covered with a rubber or other polymer coating for gripping purposes in some instances.

Further, the subassembly 100 may in some examples be symmetric or substantially symmetric across one or more planes. Symmetry or substantial symmetry may be particularly advantageous in examples where the measuring cup can receive and pour substances from both ends, that is, from the top end 114 and the bottom end 116, as described below. However, the subassembly 100 need not be symmetrical or substantially symmetrical. Furthermore, in some examples the sidewall 102 has a curved structure that promotes laminar inflow and outflow of substances to and from the measuring cup. In these examples, a circumference of the sidewall 102 may be smallest at approximately one-third or one-half of a height of the subassembly 100. In other examples, though, the circumference of the sidewall 102 may be smallest at the lower periphery 108 of the sidewall 102. Because both ends 114, 116 of the subassembly 100 may receive and pour substances, those having ordinary skill in the art will also appreciate that the handle 112 can be formed to facilitate pouring substances out of the top end 114 and the bottom end 116 of the subassembly 100. In still other examples, the sidewall 102 of the subassembly 100 may be straight with minimal or no curvature. In either case, the sidewall 102 may be said to be generally vertical. The sidewall 102 may also be said to encircle a space, one or more portions of which may be used as one or more receptacles for receiving a substance to be volumetrically measured.

The example subassembly 100 shown in FIG. 1A does not include a base. Rather, the subassembly 100 may receive a reference member formed by the components shown in FIGS. 1B-1D, as described below. In one example, an outer periphery of the reference member may be affixed to the subassembly 100 at a position 118, which has been indicated for purposes of illustration along the subassembly 100.

Nonetheless, those having ordinary skill in the art will appreciate that many of the principles, features, and example measuring cups disclosed herein may in fact utilize a traditional base (e.g., a planar structure formed across and enclosing the lower periphery 108 of the subassembly 100). While measuring cups having a traditional base may not necessarily be capable of receiving and pouring substances from both ends, many if not virtually all of the benefits disclosed herein may be realized by such measuring cups.

Those having ordinary skill in the art will further appreciate that the subassembly of the measuring cup may take on a variety of shapes and sizes. Thus although the subassembly 100 is shown and disclosed above as being generally circular, the subassembly may be generally triangular, elliptical, polygonal, square, or rectangular, for example. Even in those examples, the sidewall 102 may still be said to "encircle" a space. The outer periphery of the reference member could likewise be modified according to the contour of the subassembly. What's more, the subassembly 100 and other components of the measuring cup may in some examples be made from a variety of materials, including plastic, metal, and glass, for instance. In one example, for instance, the measuring cup may be made of Pyrex®, which is resistant to sudden changes in temperature that may be experienced during use. As a further example, the measuring cup may be molded from any suitable food grade plastic known in the art, such as styrene acrylonitrile (SAN) plastic, for instance.

With reference now to FIGS. 1B-1D, several components of a reference member in the form of an example columnar ramp are shown. In particular, an example first portion 150 of the example columnar ramp is shown in FIG. 1B. In this example, the example first portion 150 has an outer periphery 152 and one or more grooves 154. The example first portion 150 may also include a bottom 156 and a top 158, with a graduated wall 160 extending between the outer periphery 152 at the bottom 156 and the top 158. The graduated wall 160 may have a natural curvature in some examples, which, like the sidewall 102 of the subassembly 100, may promote laminar inflow and outflow of substance to and from the measuring cup. The grooves 154 of the example first portion 150 may be intended to receive printed inserts 180 shown in FIG. 1C, which may be sized and shaped to conform to the grooves 154 of the first portion 150. A first printed insert 182 may be disposed in one of the grooves 154 in the example first portion 150, while a second printed insert 184 may be disposed in another groove 154 of the example first portion 150. Although not shown in FIG. 1C, the printed inserts 180 include volumetric indicia that can be read at least from above and, in some cases, below the columnar ramp. More specifically, the first and second printed inserts 182, 184 may each have an upper surface 186 and a lower surface 188. In examples where the measuring cup can receive and pour substances from both ends 114, 116, each of the upper and lower surfaces 186, 188 of the printed inserts 180 may include volumetric indicia. For instance, a first set of volumetric indicia may be included on the upper surfaces 186 of the printed inserts 180, and a second set of volumetric indicia may be included on the lower surfaces 188 of the printed inserts 180. Moreover, in some examples where two printed inserts 180 are utilized, each printed insert may include different volumetric units. For instance, the first printed insert 182 may have volumetric indicia in Imperial units, while the second printed insert 184 may have volumetric indicia in metric units. As a further example, the first and second printed inserts 182, 184 may have, respectively, incremental volumetric indicia such that the first printed insert 182 has volumetric indicia corresponding to 1 cup, 1½ cup, and the second printed insert 184 has volumetric indicia corresponding to ¾ cup and 1¼ cup.

Nevertheless, FIG. 1D shows an example second portion 200 of the example columnar ramp. The second portion 200 may in some examples be sized and shaped so as to substantially conform to the size and shape of the first portion 150. Similar to the first portion 150, the second portion 200 may include an outer periphery 202, a bottom 204, a graduated wall 206, and a top 208. To form the columnar ramp, the second portion 200 may be placed on top of the first portion 150 so as to sandwich the printed inserts 180 between the first and second portions 150, 200. In one example, the first and second portions 150, 200 of the columnar ramp may be secured to one another, such as by welding in a plastic injection molding machine, for instance, before being affixed to the subassembly 100 at the position 118 shown in FIG. 1A. However in other examples, the first and second portions 150, 200 may be secured to one another when they are affixed to the subassembly 100. In either case, the formation of the columnar ramp prevents substances, whether liquid or solid, from entering any space, however minimal, between the first and second portions 150, 200.

Figure 2:
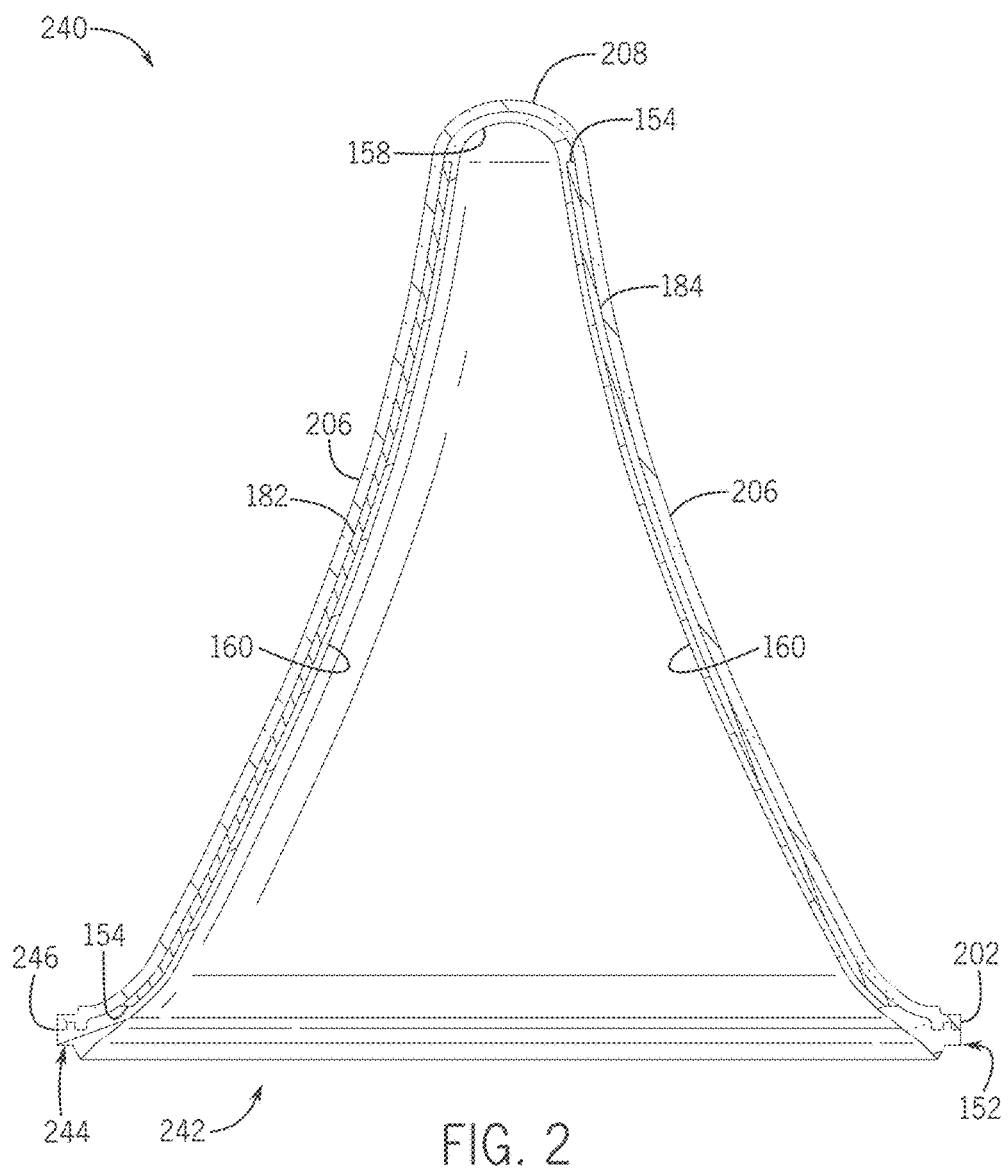
FIG. 2 is a cross-sectional view taken across line 2-2 in FIG. 3 of an example columnar ramp that may be formed of the example printed insert of FIG. 1C, the example first portion of FIG. 1B, and the example second portion of FIG. 1D.
Figure 3:
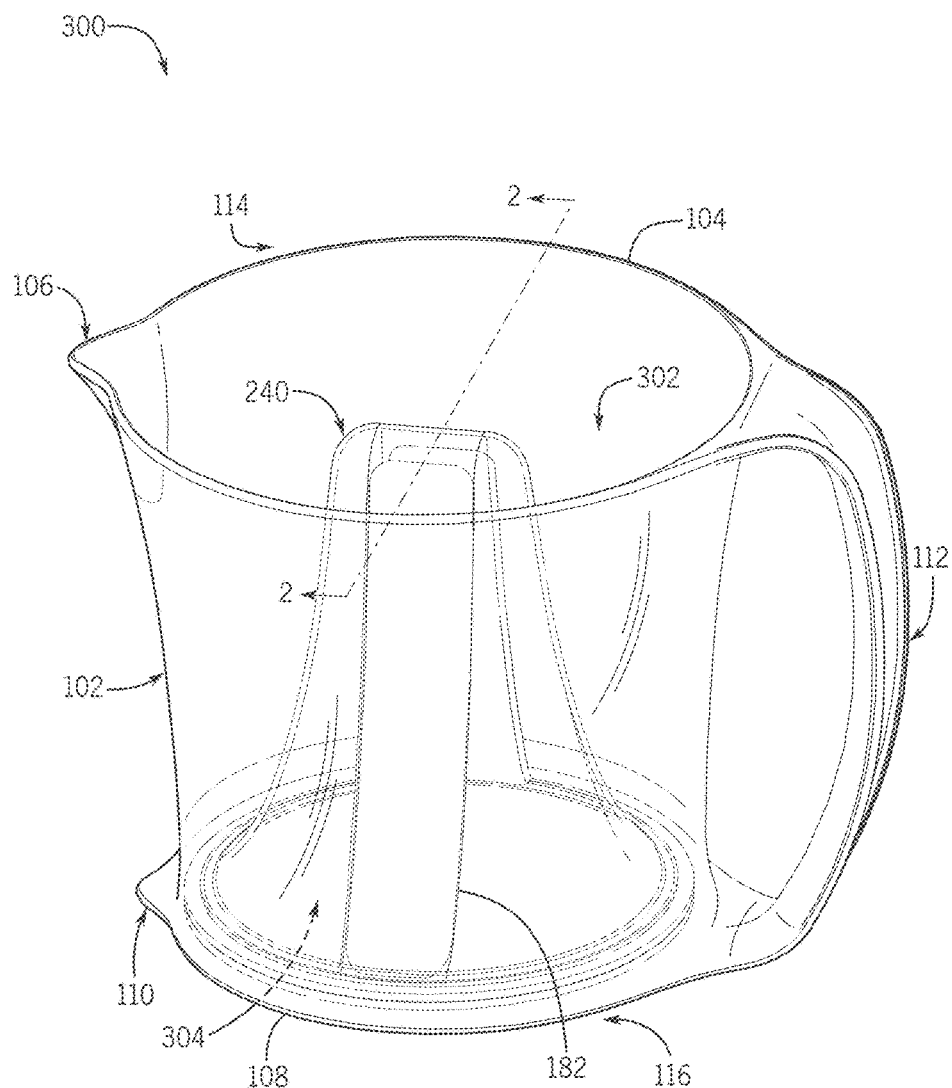
FIG. 3 is a front perspective view of an example measuring cup formed by the example subassembly of FIG. 1A, the example first portion of FIG. 1B, the example printed insert of FIG. 1C, and the example second portion of FIG. 1D.

Turning to FIG. 2, a columnar ramp 240 formed by the first portion 150, the second portion 200, and the printed inserts 180 is shown based on a cross section taken across line 2-2 in FIG. 3. The columnar ramp 240 in FIG. 2 shows more specifically how the first portion 150, second portion 200, and the printed inserts 180 may be assembled to form an example reference member. As described below, the columnar ramp 240 may include an opening 242 for receiving substances after the subassembly 100, to which the columnar ramp 240 is affixed, is inverted. In addition, the columnar ramp 240 may include an interlocking feature 244 that helps secure the first and second portions 150, 200 during pre-assembly stages, during assembly to the subassembly 100, and/or during post-assembly. By way of example, the interlocking feature 244 may help locate the second portion 200 along the first portion 150 to provide an ideal surface 246 to be affixed to the subassembly 100.

The first and second portions 150, 200 of the columnar ramp 240 forming the reference member may be made from a variety of materials, including plastic, metal, and glass, for instance. In one example, for instance, the first and second portions 150, 200 may be made of Pyrex®, which is resistant to sudden changes in temperature that may be experienced during use. As a further example, the first and second portions 150, 200 may be molded from any suitable food grade plastic known in the art, such as styrene acrylonitrile (SAN) plastic, for instance. Due to the structure of the example columnar ramp 240, the first and second portions 150, 200 should be at least partially transparent such that a user of the measuring cup can see through the first and second portions 150, 200 to the volumetric indicia on the printed inserts 180.

Those having ordinary skill in the art will appreciate that the columnar ramp 240 as shown and described need not necessarily be formed of two portions and printed inserts, or the particular features thereof (e.g., the grooves 154). For instance, a columnar ramp substantially similar to that formed by the components in FIGS. 1B-1D could be formed from a single piece of material, as opposed to two, three, or more components. The volumetric indicia could be engraved, embossed, stenciled, attached, and/or printed along the upper and lower surfaces of a single-piece columnar ramp much like the volumetric indicia on the printed inserts 180.

Though the reference member disclosed above and in the figures is shown as a columnar ramp, the present disclosure contemplates reference members of a wide variety of shapes and sizes. For example, the reference member may be or resemble a pyramid, a quasi-pyramid, stepped rings, a circular stepped staircase, and/or the like affixed to at least one of the sidewall 102 or a traditional base of a measuring cup. In general, however, the reference member is disposed substantially in a central portion of the space formed by the sidewall 102. In other words, although a portion of the reference member may be affixed to or emanate from the sidewall 102, the reference member is not positioned adjacent to, disposed along, or built into the sidewall 102.

FIG. 3 shows an example measuring cup 300 that has been formed by affixing the outer periphery 152, 202 of the columnar ramp 240 near the lower periphery 108 of the sidewall 102 of the subassembly 100. Volumetric indicia on the first printed insert 182 have again been omitted for purposes of simplicity and clarity. By affixing the columnar ramp 240 to the sidewall 102, a first receptacle 302 and a second receptacle 304 are formed. The first receptacle 302, for example, is formed by a portion of the space around the columnar ramp 240 or, put another way, the space between the columnar ramp 240 and the sidewall 102. Therefore, substances that are poured into the first receptacle 302 for measurement are supported by the sidewall 102 and the second portion 300 of the columnar ramp 240 or, in other words, the reference member. Substances that are poured into the second receptacle 304 for measurement, namely, when the measuring cup 300 is inverted, are supported primarily by the first portion 150 of the columnar ramp 240. In some examples, the columnar ramp 240 is affixed to the sidewall 102 at a position where the bottom 156 of the first portion 150 of the columnar ramp communicates with the lower spout 110 to facilitate a smooth pour when a substance is emptied from the second receptacle 304.

As those having ordinary skill in the art will recognize, the first receptacle 302 at least in the example shown in FIG. 3 is larger than the second receptacle 304 and, therefore, is more appropriate for measuring larger volumes. In addition, having two receptacles for measuring may be advantageous where a liquid is first measured and then a powdery solid is subsequently measured. By inverting the measuring cup 300 after the first measurement and measuring the powdery solid in the opposing measuring receptacle, the powdery solid will not go to waste and stick to the receptacle measuring cup 300, as may otherwise occur where a powdery substance comes in contact with a wet surface.

Figure 4:
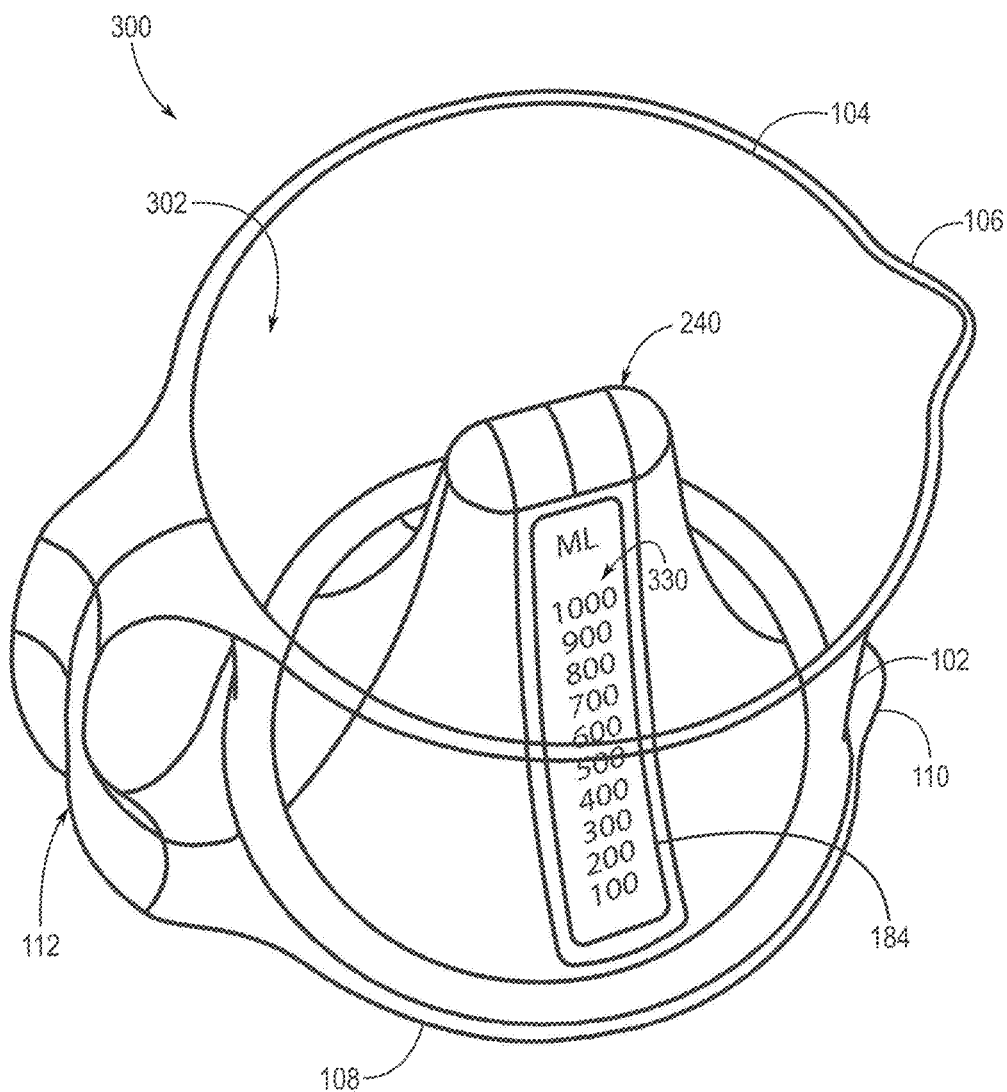
FIG. 4 is a top perspective view of the example measuring cup of FIG. 3, including volumetric indicia disposed along an upper surface of the example printed insert.

FIG. 4 shows the example measuring cup 300 of FIG. 3, but in a top perspective view from another side. The example measuring cup 300 also includes volumetric indicia 330 for indicating the volume of a substance deposited in the first receptacle 302. As shown, the volumetric indicia 330 are at least partially upwards-facing and hence readable from above the measuring cup 300.

Figure 5:
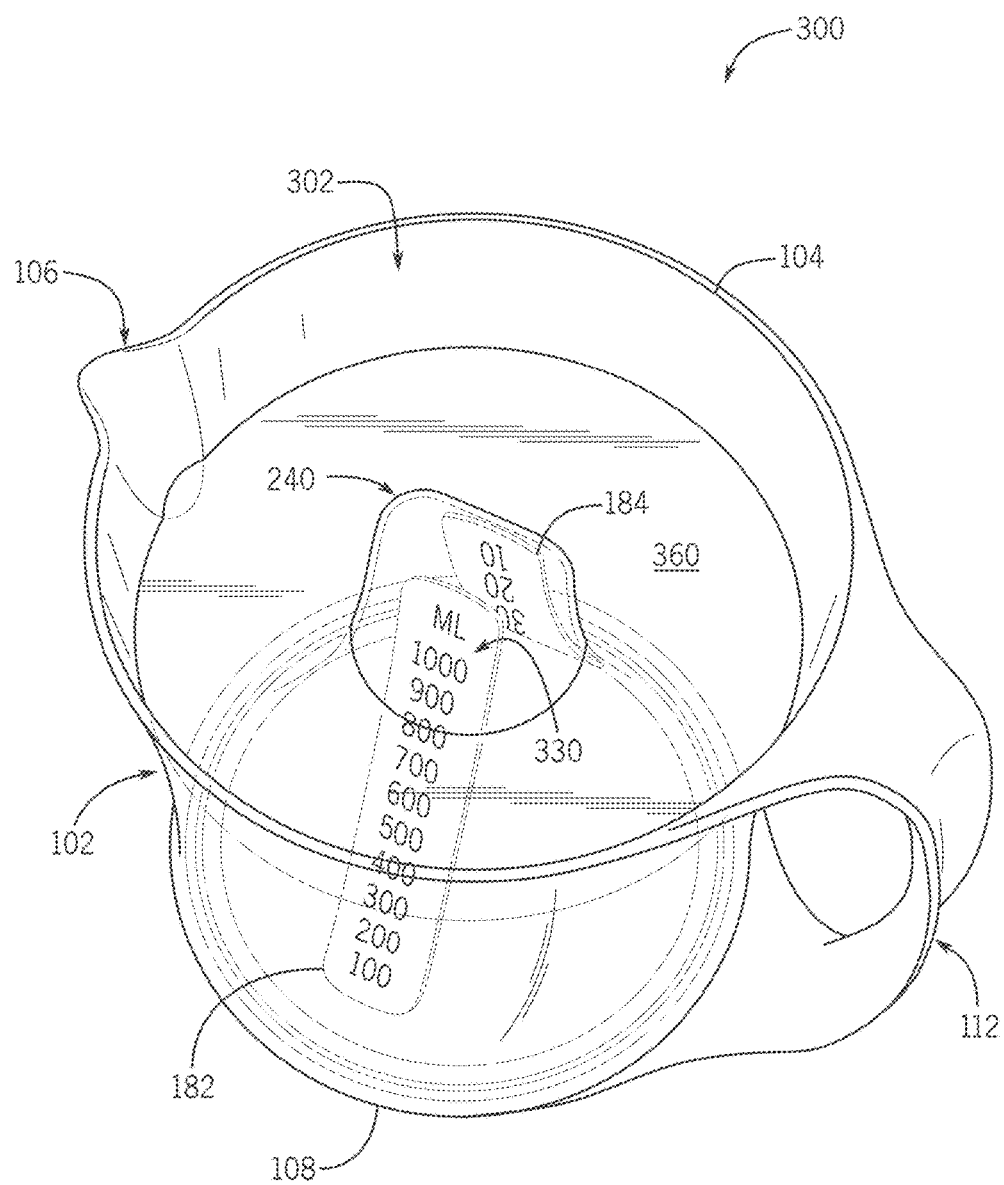
FIG. 5 is a top perspective view of the example measuring cup, including liquid disposed within the example measuring cup.

With reference now to FIG. 5, the example measuring cup 300 is shown with a liquid substance 360 deposited within the first receptacle 302. Although horizontal lines adjacent to the volumetric indicia 330 and fractional lines have been omitted from the figures those having ordinary skill in the art will understand that more precise indicia are within the scope of the present disclosure. That said, the volume of the liquid substance 360 deposited in the first receptacle 302 of the measuring cup 300 is shown to be 900 milliliters (mls), as can be read from above the printed insert 182 of the columnar ramp 240, and above the measuring cup 300 generally.

Figure 6:
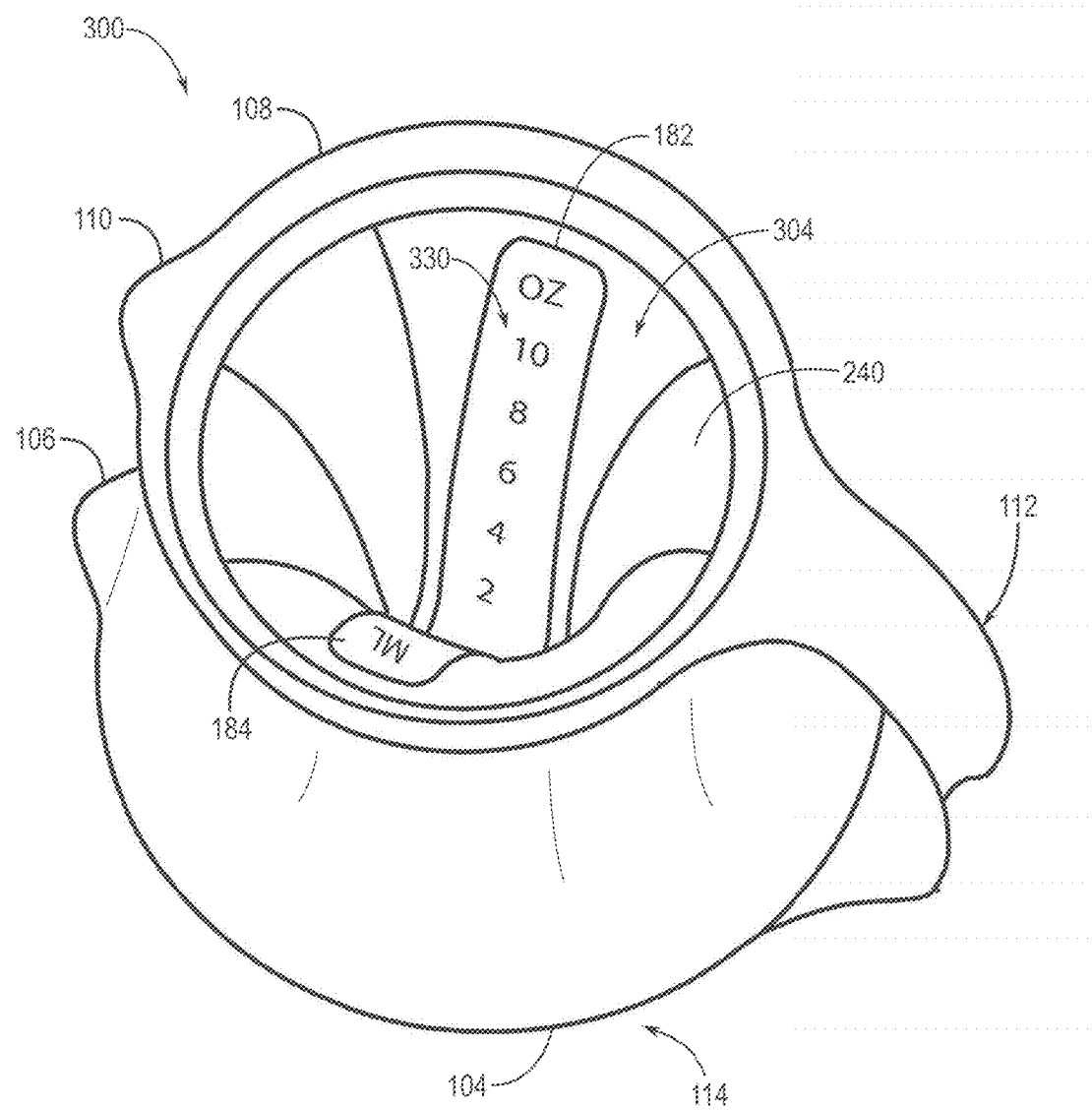
FIG. 6 is a bottom perspective view of the example measuring cup, including volumetric indicia disposed along a lower surface of the example printed insert.

Now referring to FIG. 6, the example measuring cup 300 is shown in an inverted position, providing direct access to the second receptacle 304. Notably, the measuring indicia 330 disposed on the printed insert 182 is oriented such that it is "right-side up" when looking into the second receptacle 304 of the measuring cup 300. Put another way, because FIG. 6 shows the "bottom" of the measuring cup 300, it can be said that the volumetric indicia 330 are at least partially downwards-facing with respect to the top end 114 and the bottom end 116 designations. FIG. 6 illustrates the invertible nature of the measuring cup 300, at least according to some examples.

Thus to fill the measuring cup 300 from either end, all the user needs to do is place the measuring cup 300 on a horizontal work surface and fill the measuring cup 300, looking from above until the volumetric indicia 330 for the desired volume begins to be covered with the substance, which may either be in liquid or solid form. Accordingly, the user need not bend down and view the measuring cup 300 from the side or otherwise lower his or her head to the level of the countertop or work surface. Furthermore, because a meniscus should be measured at its center, the user will be reading the appropriate volumetric indicium as the reference member is disposed at a central portion of the measuring cup.

Figure 7:
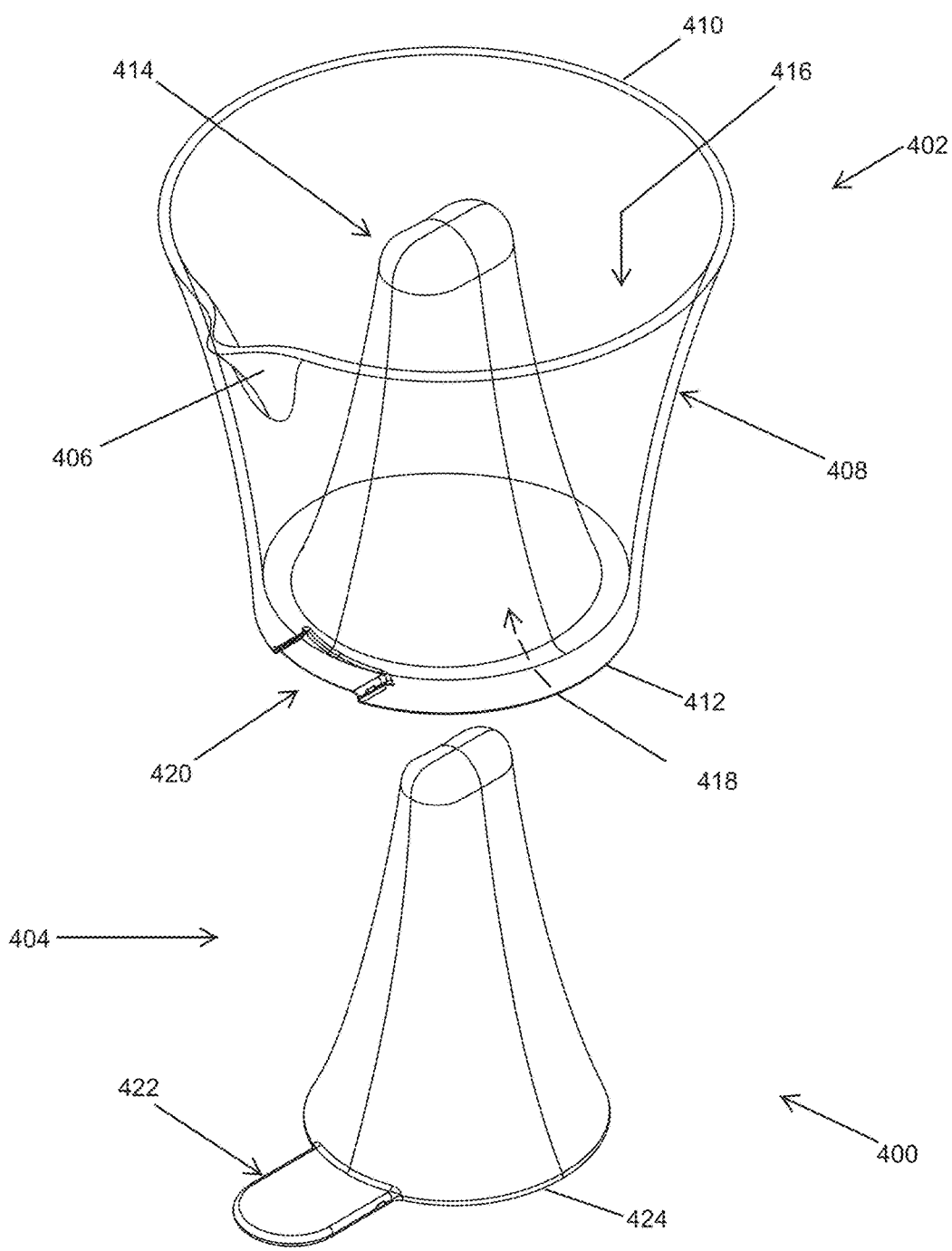
FIG. 7 is a perspective view of an example measuring cup, with a subassembly depicted above a nested measuring insert.

Still further, FIG. 7 shows an example measuring cup 400 in a disassembled state. In this example, the measuring cup 400 includes a subassembly 402 and a nested measuring insert 404 that can be removably secured to the subassembly 402. Although not shown here, the subassembly 402 may in some cases include other features, such as, for example, a handle and/or pair of spouts. The subassembly 402 may be similar in many respects to the subassembly 100 shown in FIG. 1A. For instance, the example subassembly 402 of FIG. 7 includes a spout 406, a sidewall 408, an upper periphery 410, a lower periphery 412, and a centerpiece 414. In some examples, the centerpiece 414 may be a reference member with volumetric indicia that are at least partially upwards-facing. In other examples, however, the centerpiece 414 does not necessarily have volumetric indicia. At least in examples where the centerpiece 414 does not include volumetric indicia, the centerpiece 414 may be substantially transparent so that volumetric indicia on the nested measuring insert 404 may be seen from above the subassembly 402. Regardless of whether the centerpiece 414 includes volumetric indicia, the centerpiece 414 may possess one or more of the other characteristics of the reference member disclosed above. For instance, the centerpiece may be disposed in the central portion of the space formed by the sidewall.

Moreover, those having ordinary skill in the art will understand that the centerpiece 414 is in some examples formed integrally with the subassembly 402 such that the centerpiece 414 is formed in the same step as the remainder of the subassembly 402. Yet in other examples, the centerpiece 414 may be formed separately from the remainder of the subassembly 402 and may be affixed near the lower periphery 412 of the subassembly 402 in a separate step of manufacture. Either way, a first receptacle 416 capable of receiving a substance may be formed between the sidewall 408 and the centerpiece 414. The centerpiece 414 may also form a second receptacle 418 that can be accessed by way of the lower periphery 412 of the subassembly 402. The second receptacle 418 too may be capable of receiving a substance to be measured.

In some examples, the centerpiece 414 may be at least partially opaque with printed volumetric indicia on both sides. Thus, in these examples, a user can fill the first receptacle 416 with a substance and read volumetric indicia of the centerpiece 414 from above to determine a volume of the substance. Likewise, a user can flip the example measuring cup 400 over, fill the second receptacle 418 with a substance, and then read volumetric indicia from another side of the centerpiece 414 to determine a volume of the substance. Similar to the example measuring cup 300 disclosed above, the second receptacle 418 may be advantageous for measuring smaller volumes and/or measuring a second type of substance (e.g., measuring flour in the first receptacle 416 and then measuring olive oil in the second receptacle 418 without having to wash out the measuring cup 400). In still other examples, though, only one side of the centerpiece 414 or no sides of the centerpiece 414 may include volumetric indicia. In such examples, one or both sides of the nested measuring insert 404 may include volumetric indicia. In any case, the volumetric indicia, whether included on the centerpiece 414 and/or the nested measuring insert 404, may allow a user to determine the volume of a substance poured into the first receptacle 416, the second receptacle 418, or a receptacle of the nested measuring insert 404 from above the example measuring cup 400.

The example subassembly 402 of FIG. 7 may further include a recess 420 that is capable of receiving a tab 422 of the nested measuring insert 404. In some examples, the nested measuring insert 404 is configured to be substantially similar in size and shape to the centerpiece 414 of the subassembly 402. More particularly, the nested measuring insert 404 may have a size and shape that allows the nested measuring insert 404 to be received within the second receptacle 418 formed by the centerpiece 414. Because the second receptacle 418 can receive the nested measuring insert 404, the nested measuring insert 404 will in most examples be slightly smaller than the centerpiece 414. However, the difference in size may be beneficial in terms of providing a user with measuring instruments of varying sizes. What's more, that the nested measuring insert 404 can be received by the second receptacle 418 of the subassembly 402 allows a user to consolidate measuring instruments, which is helpful for purposes of stowing, for example. Furthermore, the tab 422 of the nested measuring insert 404 may be configured to mate with the recess 420 of the subassembly 402.

The nested measuring insert 404 may be removably retained in and/or to the subassembly 402 in a number of ways. In one example, both the recess 420 of the subassembly 402 and the tab 422 of the nested measuring insert 404 may be notched. The respective notches of the recess 420 and the tab 422 may then engage and mate with one another to secure the nested measuring insert 404 to the subassembly 402. In another example, a button may be utilized to secure the nested measuring insert 404 to the subassembly 402. In still another example, the subassembly 402 of the example measuring cup 400 may include an internal lip disposed near the lower periphery 412. The internal lip may discontinuous, at least near the recess 420. The internal lip may be sized so as to form an interference fit with an outer periphery 424 of the nested measuring insert 404. As such, as the nested measuring insert 404 is positioned within the second receptacle 418 of the subassembly 402, the outer periphery 424 of the nested measuring insert 404 may be "snapped" to fit within the internal lip of the subassembly 402. To release the nested measuring insert 404 from the subassembly 402, a user may grasp the tab 422 of and pull the nested measuring insert 402 free from the subassembly 402. In some examples the nested measuring insert 404 may be slightly deformable, which in turn facilitates some types of engagement and disengagement with the subassembly 402. In still other examples, a plurality of projections may extend slightly inward from the lower periphery 412 to "catch" the outer periphery 424 of the nested measuring insert 404 until a user grasps the tab 422 to remove the nested measuring insert 404 from the subassembly 402.

Figure 8:
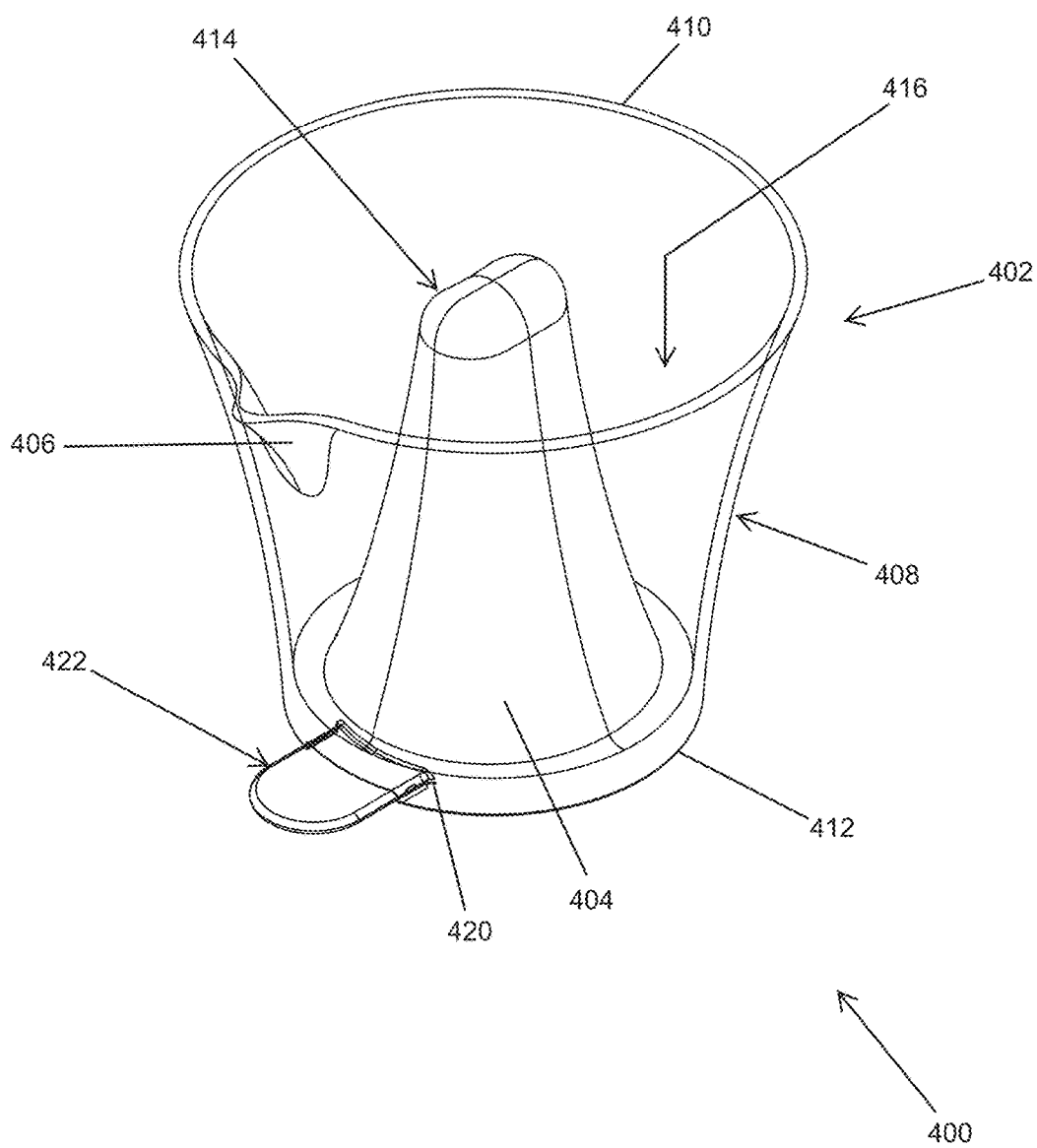
FIG. 8 is a perspective view of the example measuring cup of FIG. 7, with the nested measuring insert positioned integral with the subassembly.

With reference to FIG. 8, the example measuring cup 400 is shown with the nested measuring insert 404 retained in the second receptacle 418 of the subassembly 402. It should be understood that in some instances the recess 420 may be designed so that the lower periphery 412 of the subassembly 402 sits flush with a flat surface when the nested measuring insert 404 is positioned in the second receptacle 418 of the subassembly 402. FIG. 8 also illustrates how in some examples the tab 422 of the nested measuring insert 404 protrudes from the recess 420 of the subassembly 402. That the tab 422 protrudes from the recess 420 allows a user to easily grasp the tab 422 and remove the nested measuring insert 404 from the subassembly 402 when desired.

In the example measuring cup 400 of FIG. 8, the recess 420 disposed along the lower periphery 412 is shown to be directly beneath the spout 406 disposed along the upper periphery 410. Those having ordinary skill in the art will recognize that in examples where a handle and a second spout are included, the recess 420 may be disposed beneath a handle on the opposite side of the subassembly from the spout 406. A second spout may then be disposed along the lower periphery 412 where the recess 420 is shown in FIG. 8. Positioning these features in this way would permit the handle to control flow from both spouts and prevent the recess 420 from interfering with such utility.

Figure 9:
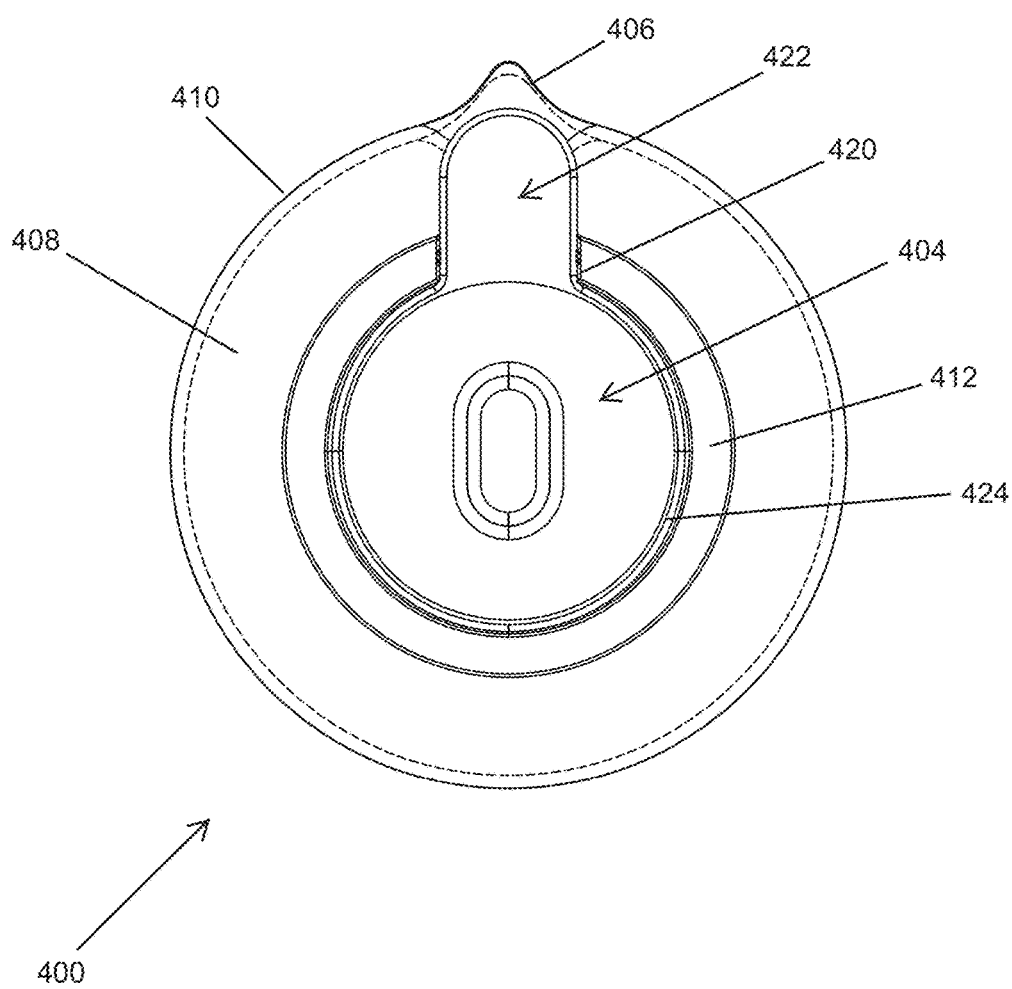
FIG. 9 is a bottom view of the example measuring cup of FIG. 8.
Figure 10:
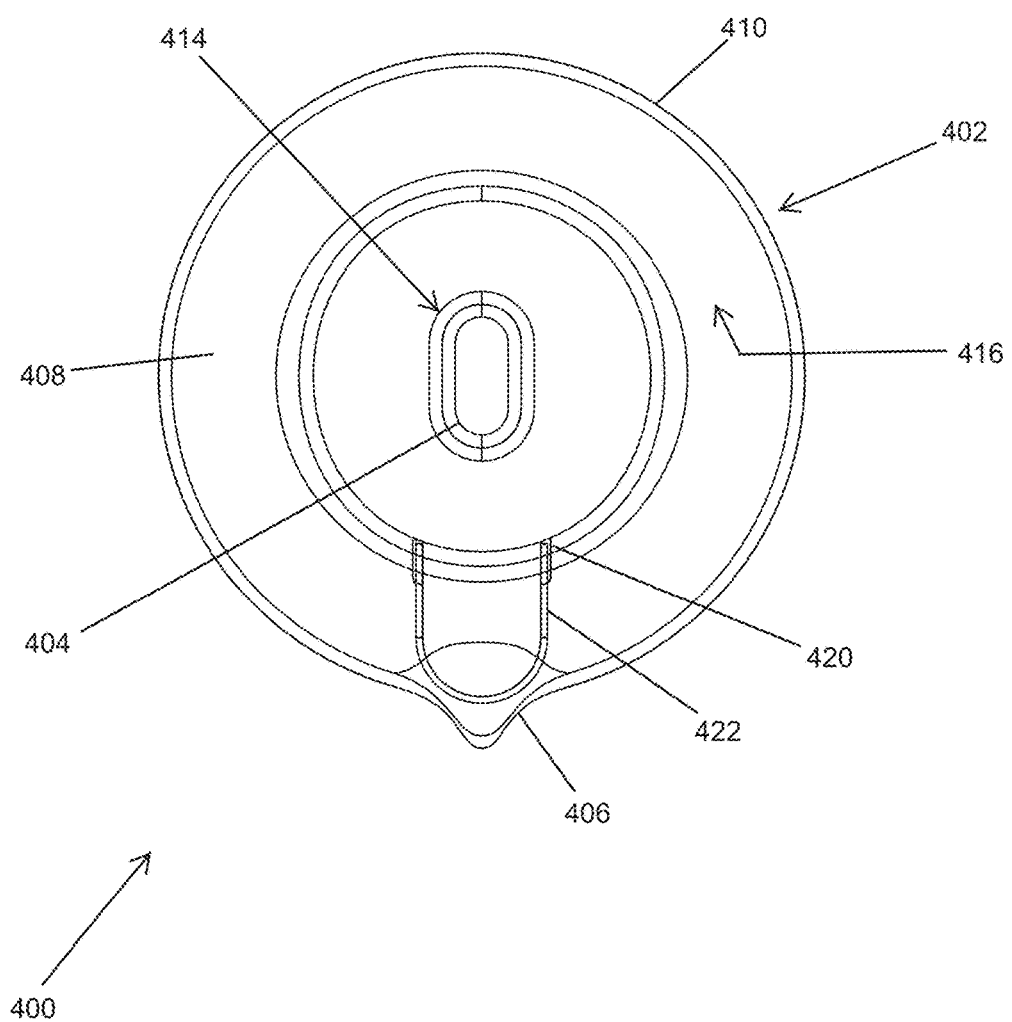
FIG. 10 is a top view of the example measuring cup of FIG. 8.

FIG. 9 shows a bottom view of the example measuring cup 400, with the nested measuring insert 404 retained in the subassembly 402. As shown in FIG. 9, the recess 420 in the lower periphery 412 makes way for the tab 422 of the nested measuring insert 404. Conversely, FIG. 10 shows a top view of the example measuring cup 400, with the nested measuring insert 404 still retained in the subassembly 402.

Figure 11:
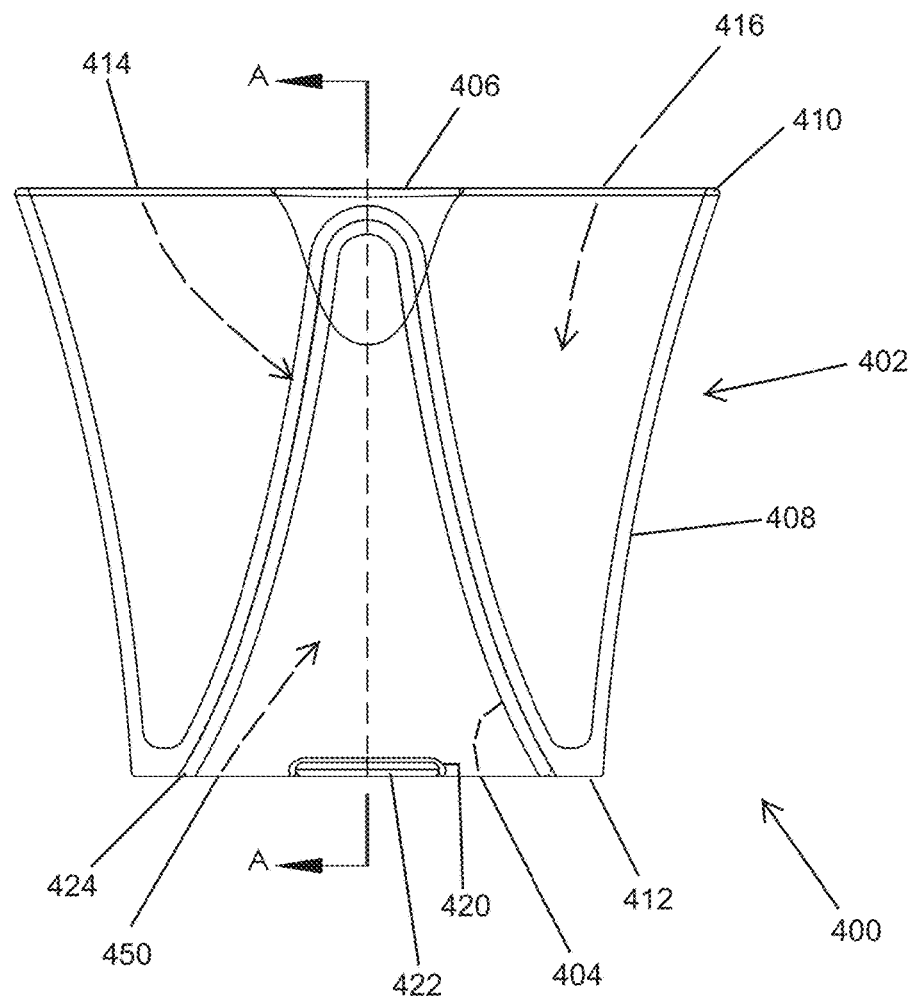
FIG. 11 is a side view of the example measuring cup of FIG. 8.
Figure 12:
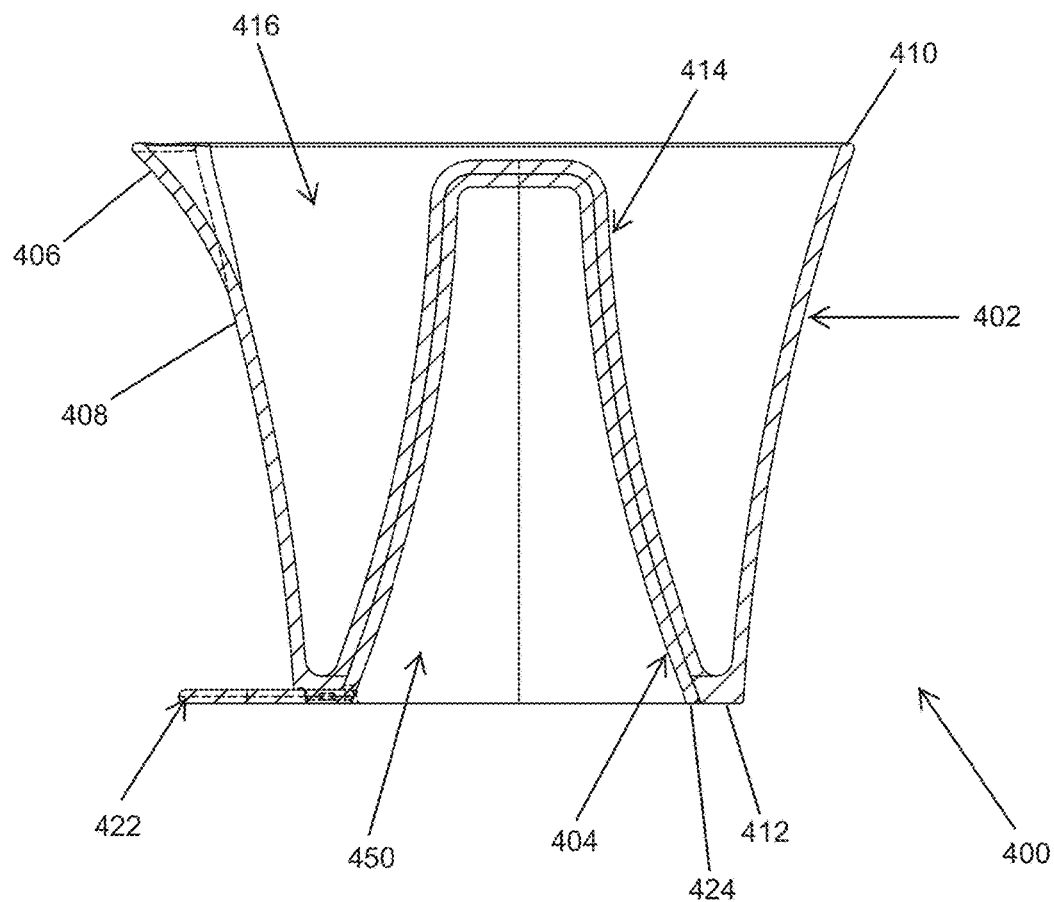
FIG. 12 is a cross-sectional view of the example measuring cup taken across line A-A of FIG. 11.

FIG. 11 shows a side view of the example measuring cup 400, with the nested measuring insert 404 retained in the subassembly 402. The side view of FIG. 11 reveals how in this example the contour of the nested measuring insert 404 is substantially similar to the contour of the centerpiece 414 of the subassembly 402. Also shown in FIG. 11 is a receptacle 450 of the nested measuring insert 404. One having ordinary skill in the art will recognize that the receptacle 450 of the nested measuring insert 404 is smaller than the first receptacle 416 of the subassembly 402 in this instance. Likewise, those having ordinary skill in the art will recognize that the example measuring cup 400 shown in FIG. 11 provides users with three receptacles in which to measure the volume of substances. This may be particularly advantageous where two or three different substances are being measured and the user does not wish to rinse the measuring cup 400 after each measurement. The example measuring cup 400 is shown from yet another perspective in FIG. 12, which provides a cross-sectional view taken across line A-A in FIG. 11.

Figure 13:
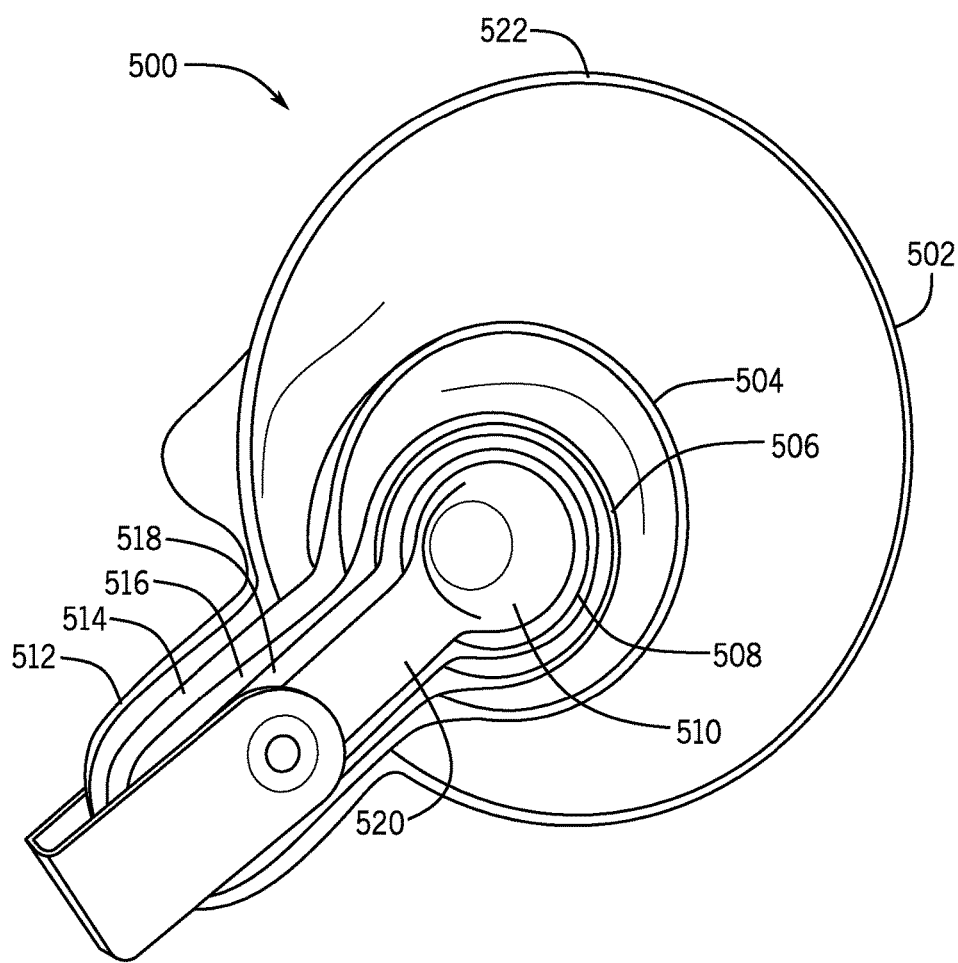
FIG. 13 is a perspective view of another example nested measuring insert.

Turning now to FIG. 13, another example nested measuring insert 500 is shown for use with the example measuring cup 400. Although the nested measuring insert 404 of FIGS. 7-12 is shown to include one measuring receptacle, it should be understood that in other examples the nested measuring insert 500 may include more than one measuring receptacle. For instance, the example nested measuring insert 500 includes five measuring receptacles 502, 504, 506, 508, 510 that are nested within one another. By nesting the measuring receptacles 502, 504, 506, 508, 510 within one another, space is saved during stowage. Moreover, users are provided with a compact measuring cup that offers various sized receptacles in which to measure volumes of substances. The nested measuring insert 500 may be stowed in the measuring cup 400, but may be used separately. In some examples, the nested measuring insert 500 may be stowed in the measuring cup 400 when a user is employing another receptacle of the measuring cup. In some examples, each of the measuring receptacles 502, 504, 506, 508, 510 may include volumetric indicia. In examples where the nested measuring insert includes a plurality of measuring receptacles, a corresponding recess in the lower periphery of the subassembly may need to be sized accordingly.

In some instances, the plurality of measuring receptacles 502, 504, 506, 508, 510 will each have a tab 512, 514, 516, 518, 520 by which to handle and/or secure the measuring receptacles 502, 504, 506, 508, 510. To that end, the plurality of measuring receptacles 502, 504, 506, 508, 510 may be secured to one another in a variety of ways. As merely an example, the measuring receptacles 502, 504, 506, 508, 510 may be secured in a customary fashion (e.g., a button-like fastener). In some cases, the tab 512 corresponding to the largest measuring receptacle 502 of the example nested measuring insert 500 may be the widest. The widest tab 512 may then be secured to the receptacle. Alternatively, the plurality of measuring receptacles 502, 504, 506, 508, 510 may be secured to one another in a way that allows a lower periphery 522 of the largest measuring receptacle 502 to be removably retained near the lower periphery 412 of the subassembly 402 without preventing the lower periphery 412 from sitting flush with a flat surface. For instance, each respective tab 512, 514, 516, 518, 520 may be concaved so that each tab may be nested within the next largest tab, thereby causing the largest tab 512 and the lower periphery 522 of the largest measuring receptacle 502 to be the lowest surfaces of the nested measuring insert 500.

In some instances, therefore, the largest measuring receptacle 502 will be flexible such that the measuring receptacle 502 can be slightly deformed to secure the measuring receptacle 502 to the subassembly 402. However, those having ordinary skill in the art will further appreciate that particularly in examples where the largest measuring receptacle 502 is the primary point of contact with the subassembly 402, the measuring receptacle 502 will be of sufficient stiffness so as to support the other measuring receptacles 504, 506, 508, 510. Much the same, those having ordinary skill in the art will understand that the nested measuring insert 500 shown in FIG. 13 is just an example and that other nested measuring inserts may vary in many respects.

Figure 14:
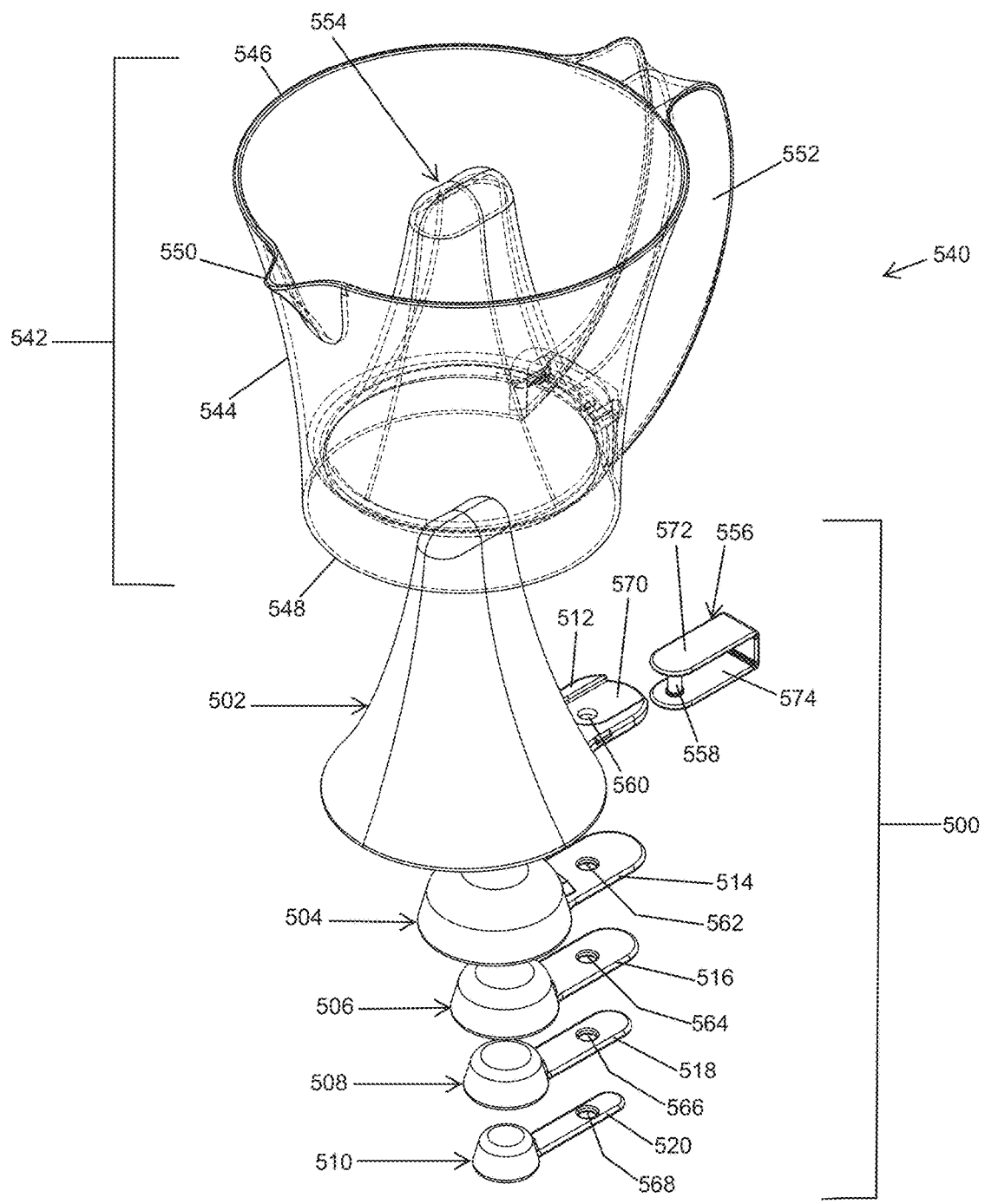
FIG. 14 is a perspective exploded view of an example measuring cup having an example nested measuring insert.

FIG. 14 shows an example measuring cup 540 in exploded view that includes the example nested measuring insert 500 of FIG. 13. An example subassembly 542 may include many or all of the features disclosed above, such as, for instance, a sidewall 544, an upper periphery 546, a lower periphery 548, a spout 550, a handle 552, a centerpiece 554, and the like. FIG. 14 also shows an example of how the example measuring receptacles 502, 504, 506, 508, 510 of the nested measuring insert 500 may be secured to one another. In this example, a clasp 556 may be secured around the tabs 512, 514, 516, 518, 520 of the measuring receptacles 502, 504, 506, 508, 510. More particularly, the clasp 556 may include a shaft 558 that can be positioned through slots 560, 562, 564, 566, 568 of the tabs 512, 514, 516, 518, 520 of the measuring receptacles 502, 504, 506, 508, 510. In one example, the shaft 558 may be secured back to the clasp 556 be forcing an oversized head through a hole on the clasp 556.

Still further, in one example the tab 512 of the largest measuring receptacle 502 may include a depression 570 that receives an upper portion 572 of the clasp 556. The depression 570 may allow the upper portion 572 of the clasp 556 to sit substantially flush with the tab 512 of the measuring receptacle 502. Likewise, in some examples the tab 520 of the smallest measuring receptacle 510 may include a similar depression that receives a lower portion 574 of the clasp 556.

Figure 15:
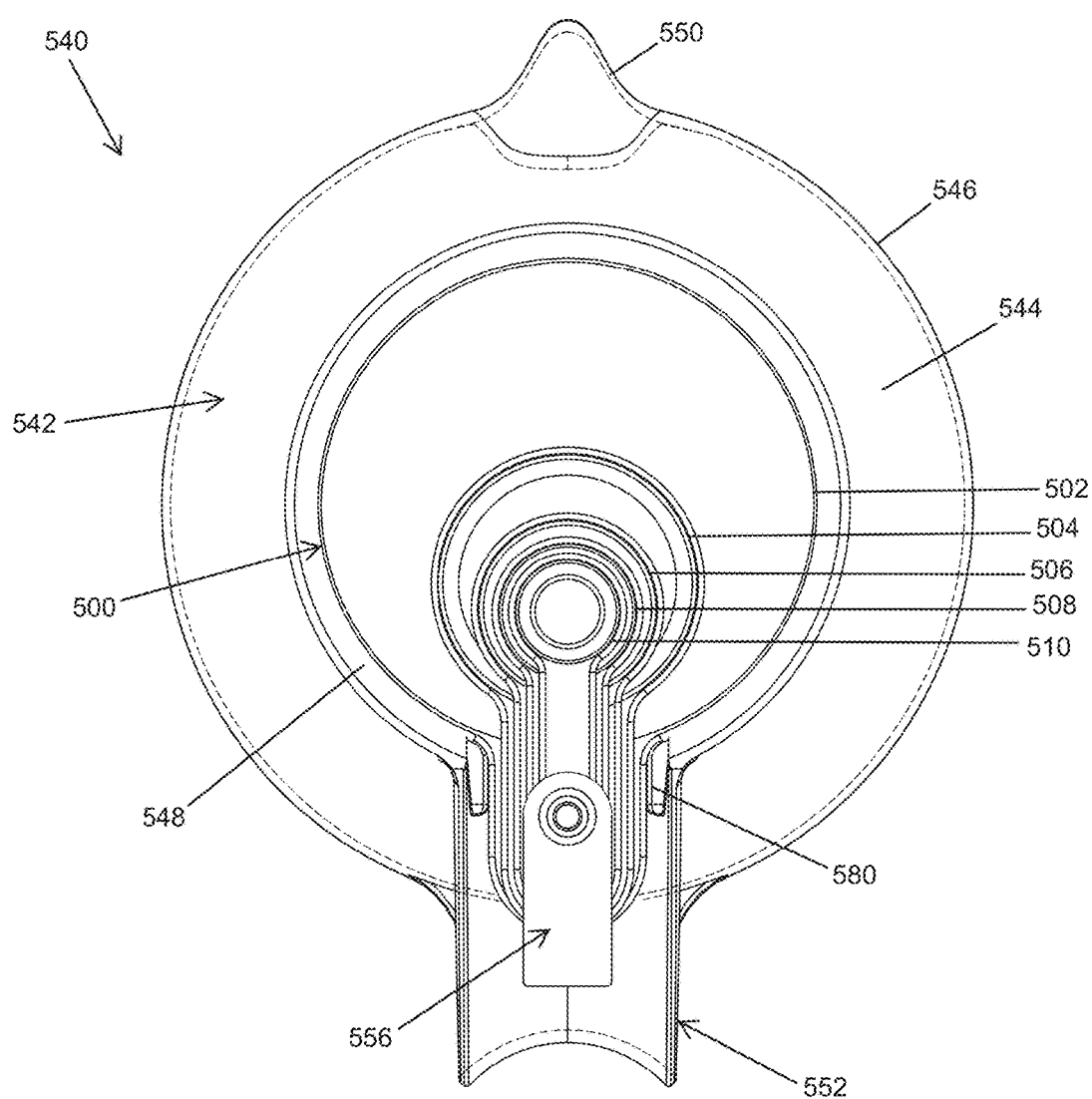
FIG. 15 is a bottom view of the example measuring cup of FIG. 14, with the measuring cup shown to be intact.

With respect to FIG. 15, a bottom view of the example measuring cup 540 is shown intact. The measuring cup 540 includes the subassembly 542 and the nested measuring insert 500. Also shown from this view is a recess 580 in the lower periphery 548 that is sized to receive the tabs 512, 514, 516, 518, 520 of the measuring receptacles 502, 504, 506, 508, 510 as well as the clasp 556. One having ordinary skill in the art will appreciate that even though the tabs 512, 514, 516, 518, 520 may protrude from the lower periphery 548 of the sidewall 544, the tabs 512, 514, 516, 518, 520 may be positioned underneath the handle 552 so as to minimize a profile of the measuring cup 540.

Figure 16:
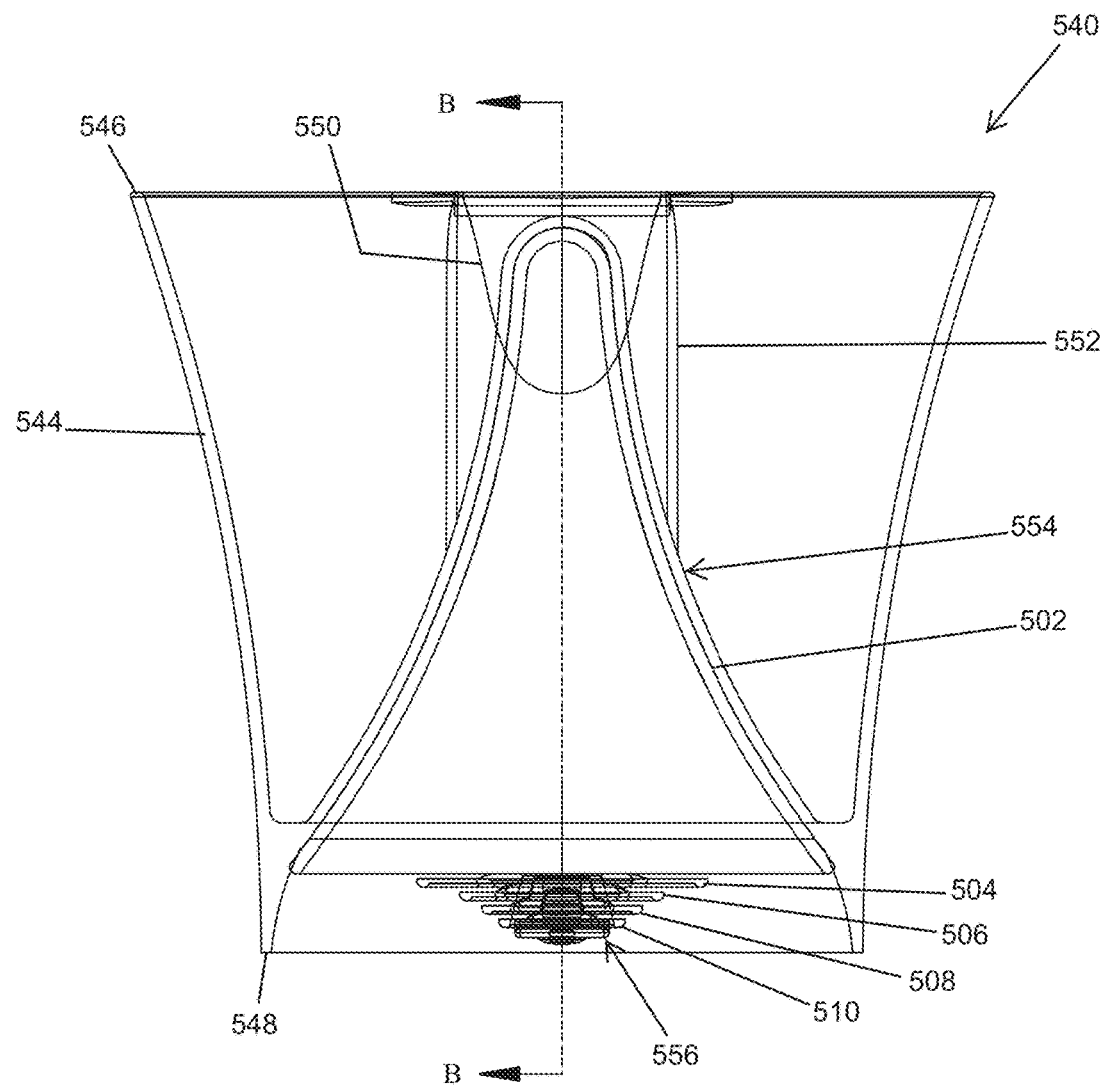
FIG. 16 is a side view of the example measuring cup of FIG. 14, with the measuring cup shown to be intact.

FIG. 16 shows still another perspective of the example measuring cup 540. In this example, the recess 580 in the lower periphery 548 is made large enough such that the clasp 556 and the tabs 512, 514, 516, 518, 520 of the measuring receptacles 502, 504, 506, 508, 510 do not protrude below the lower periphery 548 of the measuring cup 540. Therefore, the lower periphery 548 of the measuring cup 540 will sit flush with a flat supporting surface. Those having ordinary skill in the art will understand that the structure of the nested measuring insert 500 shown in the figures is merely an example. For instance, in other examples the tabs of the measuring receptacles may be concave so that each respective tab is capable of receiving the subsequent tab.

Figure 17:
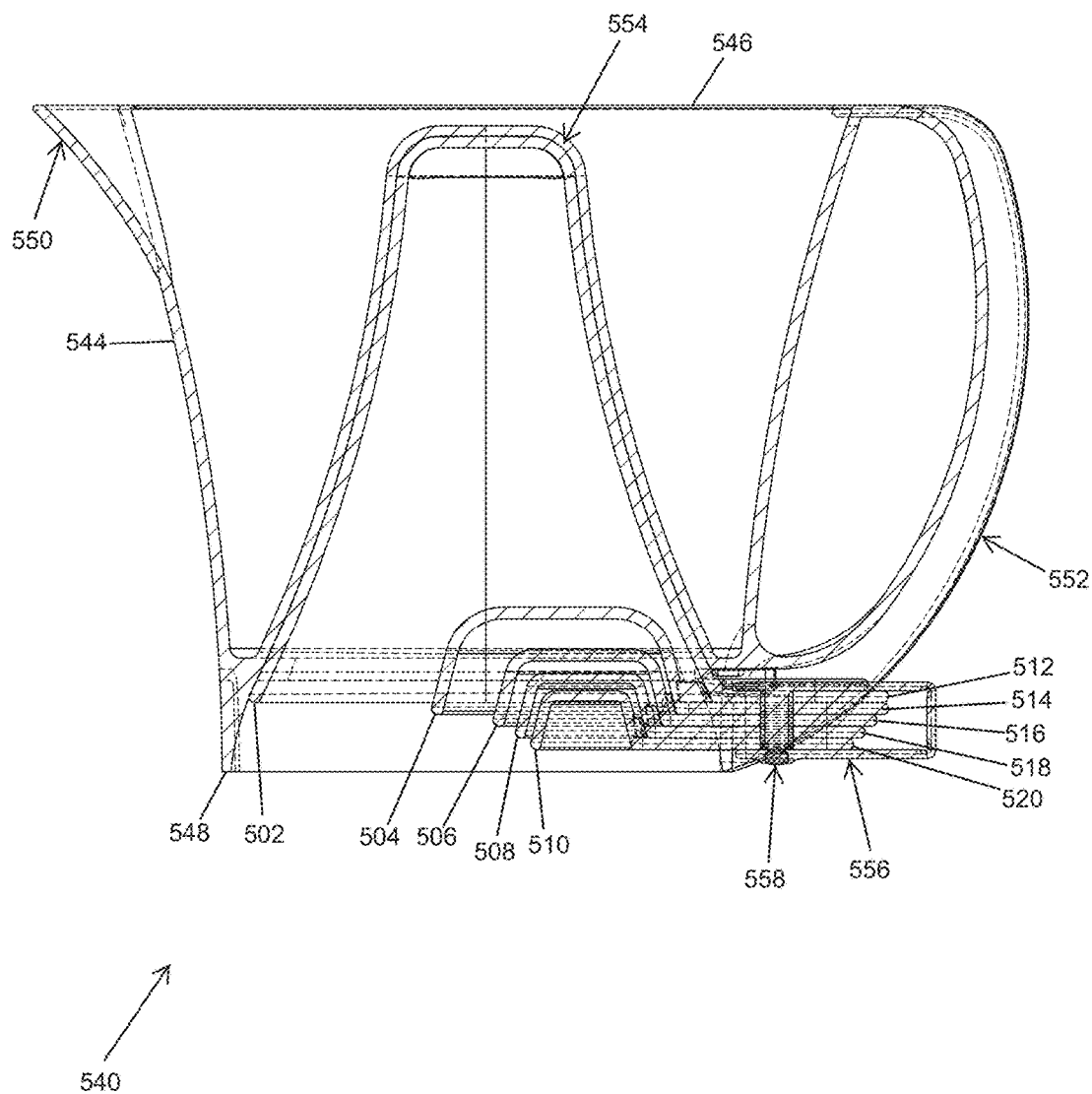
FIG. 17 is a cross-sectional view of the example measuring cup taken across line B-B of FIG. 16.

FIG. 17 shows a cross-sectional view of the example measuring cup 540 taken across line B-B of FIG. 16. FIG. 17 shows how the measuring receptacles 502, 504, 506, 508, 510 may be "nested" within one another. One having ordinary skill in the art will appreciate that the less cantilevered each respective measuring receptacle 502, 504, 506, 508, 510 is from the clasp 556 and the shaft 558, the more stable the measuring cup 540 will be. That said, it should be understood that the respective sizes of the measuring receptacles 502, 504, 506, 508, 510 shown in FIG. 17 are merely examples. In another example, the measuring receptacle 504 may be considerably larger and/or of another shape, for instance.

Although certain example methods and apparatus have been described herein, the scope of coverage of this patent is not limited thereto. On the contrary, this patent covers all methods, apparatus, and articles of manufacture fairly falling within the scope of the appended claims either literally or under the doctrine of equivalents.

We claim:

1. A measuring cup comprising:
   a sidewall that is generally vertical and encircles a space, the sidewall having an upper periphery and a lower periphery;
   a spout disposed along the upper periphery of the sidewall;
   a centerpiece disposed substantially in a central portion of the space formed by the sidewall;
   a receptacle capable of receiving a substance, the receptacle formed by a portion of the space between the centerpiece and the sidewall; and
   a nested measuring insert that is removably retained beneath the centerpiece, wherein the nested measuring insert does not extend below a bottom of the lower periphery of the sidewall, and wherein at least one of the centerpiece or the nested measuring insert include volumetric indicia.

2. A measuring cup of claim 1 wherein the nested measuring insert comprises a tab, wherein the measuring cup further comprises a recess in the lower periphery of the sidewall, the recess capable of receiving the tab of the nested measuring insert so that a remainder of the lower periphery sits flush with a flat supporting surface.

3. A measuring cup of claim 2 wherein the recess retains the tab of the nested measuring insert and the tab protrudes outward from the recess and the lower periphery, wherein the nested measuring insert is released from the recess by pulling the tab away from the recess.

4. A measuring cup of claim 1 wherein the nested measuring insert has a contour that is substantially similar to a contour of the centerpiece.

5. A measuring cup of claim 1 further comprising a spout disposed along the lower periphery of the sidewall.

6. A measuring cup of claim 1 wherein both the centerpiece and the nested measuring insert comprise the volumetric indicia.

7. A measuring cup of claim 1 wherein the nested measuring insert comprises a plurality of measuring receptacles.

8. A measuring cup of claim 7 wherein each of the plurality of measuring receptacles comprises a tab that is utilized at least to secure the plurality of measuring receptacles to one another.

9. A measuring cup of claim 1, further comprising a handle extending from the sidewall.

10. A measuring cup comprising:
a sidewall that encircles a space, the sidewall having an upper periphery and a lower periphery;
a centerpiece disposed substantially in a central portion of the space formed by the sidewall, the centerpiece forming a first receptacle and a second receptacle that are capable of receiving a substance, wherein the first receptacle is accessible through the upper periphery and is defined by a portion of the space between the centerpiece and the sidewall, wherein the second receptacle is accessible through the lower periphery; and
a nested measuring insert that is removably retained beneath the centerpiece in the second receptacle,
wherein the nested measuring insert comprises a tab, wherein the measuring cup further comprises a recess in the lower periphery of the sidewall, the recess capable of receiving the tab of the nested measuring insert so that a remainder of the lower periphery sits flush with a flat supporting surface.

11. A measuring cup of claim 10 further comprising:
a spout disposed along the upper periphery of the sidewall; and
a handle extending from the sidewall.

12. A measuring cup of claim 11 further comprising a spout disposed along the lower periphery of the sidewall.

13. A measuring cup of claim 10 wherein at least one of the centerpiece or the nested measuring insert includes volumetric indicia that are readable from above the upper periphery of the sidewall.

14. A measuring cup of claim 10 wherein the recess retains the tab of the nested measuring insert and the tab protrudes outward from the recess and the lower periphery, wherein the nested measuring insert is released from the recess by pulling the tab away from the recess.

15. A measuring cup of claim 10 wherein the nested measuring insert comprises a plurality of measuring receptacles.

16. A measuring cup of claim 15 wherein each of the plurality of measuring receptacles comprises a tab that is utilized at least to secure the plurality of measuring receptacles to one another.

17. A measuring cup of claim 10 wherein the nested measuring insert has a contour that is substantially similar to a contour of the centerpiece.

18. A measuring cup comprising:
a sidewall that encircles a space, the sidewall having an upper periphery and a lower periphery;
a handle extending from the sidewall;
a spout disposed along the upper periphery of the sidewall;
a centerpiece disposed substantially in a central portion of the space formed by the sidewall;
a receptacle capable of receiving a substance, the receptacle formed by a portion of the space between the centerpiece and the sidewall; and
a nested measuring insert that is removably retained beneath the centerpiece, the nested measuring insert comprising a tab;
a recess in the lower periphery of the sidewall, the recess capable of receiving and removably retaining the tab of the nested measuring insert, wherein the nested measuring insert is released from the recess by pulling the tab away from the recess.

19. A measuring cup of claim 18 wherein the nested measuring insert comprises a plurality of measuring receptacles.

20. A measuring cup of claim 19 wherein each of the plurality of measuring receptacles includes volumetric indicia.

* * * * *